VARIATIONS IN pH VALUE WHEN
$Na_2SO_3$ IS ADDED TO AQUEOUS
SOLUTION OF 8% $NaHSO_3$

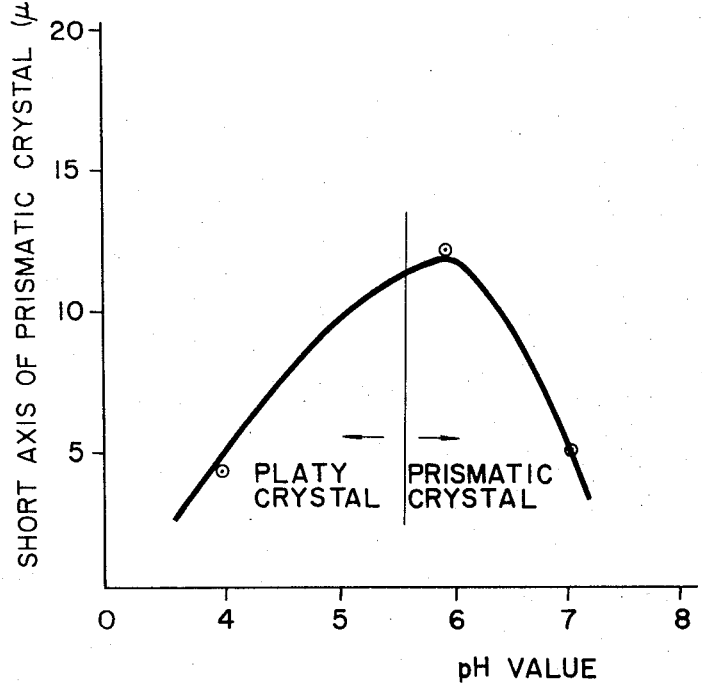
RELATIONSHIP BETWEEN pH VALUE OF REACTION SYSTEM AND SHORT AXIS OF PRISMATIC CRYSTAL OF CALCIUM SULFITE

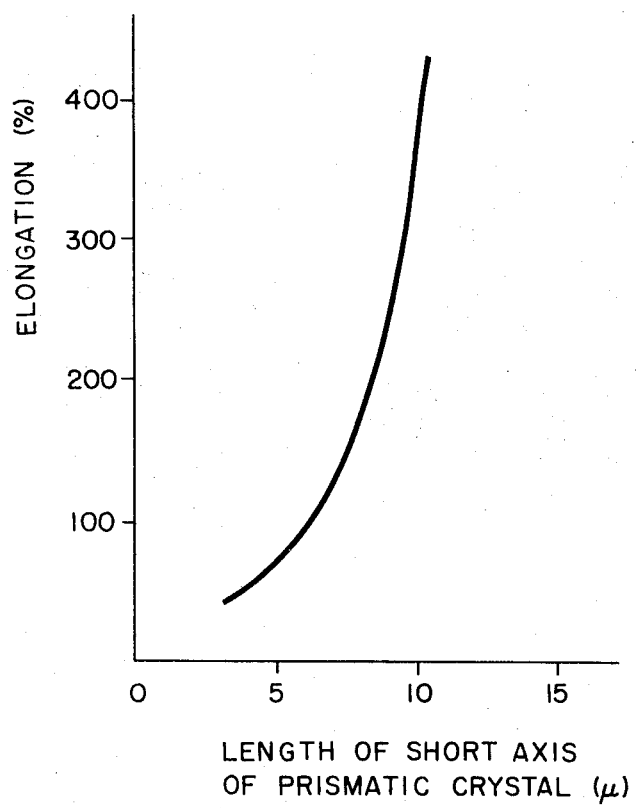

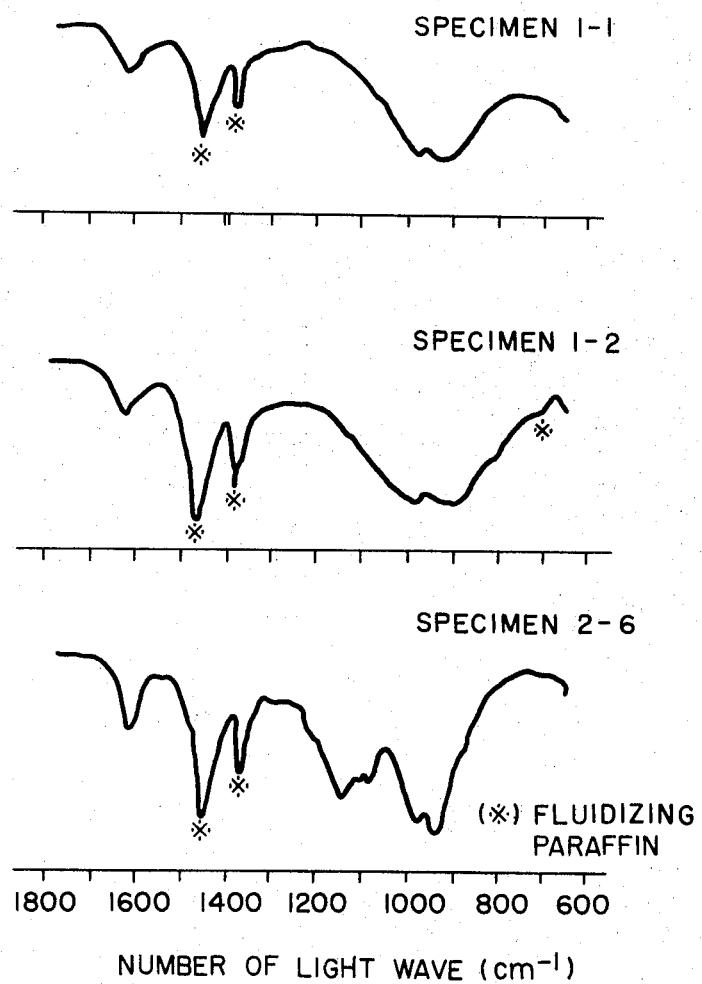

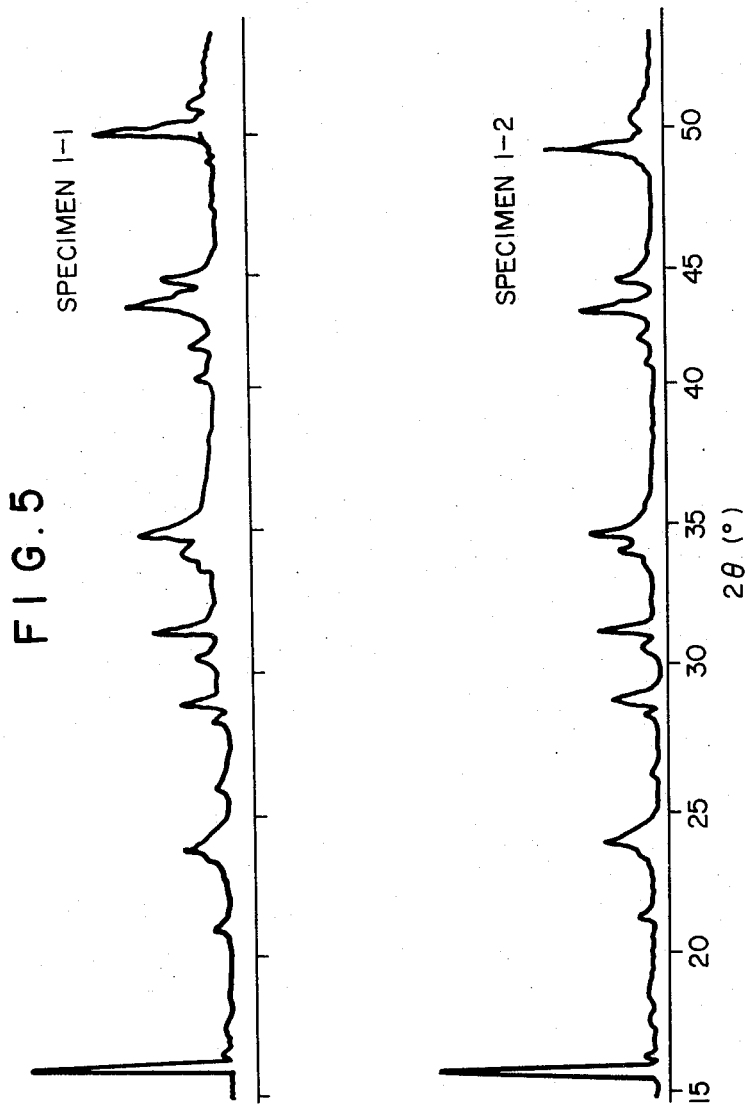

3,848,070
METHOD FOR PRODUCING CALCIUM
SULFITE SEMIHYDRATE
Mitsuo Onozuka, Koki Nomoto, Kinji Iida, and Tomijiro Morita, Iwaki, Japan, assignors to Kureha Kagaku Kogyo Kabushiki Kaisha, Tokyo-to, Japan
Filed Oct. 3, 1972, Ser. No. 294,599
Claims priority, application Japan, Oct. 5, 1971, 46/78,126
Int. Cl. C01b 17/00
U.S. Cl. 423—512 2 Claims

ABSTRACT OF THE DISCLOSURE

A method for producing calcium sulfite semihydrate by reacting calcium carbonate with an aqueous mixture solution of acidic alkali sulfide and alkali sulfite at predetermined reaction conditions.

---

The present invention relates to a process for synthesizing calcium sulfite semihydrate having a crystal size of from 1 to 100μ (the minor axis of 1–30μ, and the major axis of 5–100μ), wherein calcium carbonate is added to an aqueous mixture solution of acidic alkali sulfite and alkali sulfite.

Desulfuration of sulfur compounds, particularly, sulfur dioxide gas, contained in exhaust gas has been taken seriously in these days at mineral refineries, steam-power stations and chemical plants. A great many processes have been developed for removing sulfur dioxide gas contained in combustion exhaust gas, however, since a significant increase in demand for sodium sulfite obtained from the desulfuration may not be anticipated at present as well as in the future in view of the current stagnated situation of the paper industry, research and development of a process for producing gypsum-type inorganic salts therefrom has drawn attention of all concerned.

It is an object of the present invention to provide an improved method of producing calcium sulfite for use in manufacturing composite material having improved capability.

It is another object of the present invention to provide a method for producing calcium sulfite, wherein calcium carbonate is added to an aqueous mixture solution of acidic alkali sulfite and alkali sulfite, and reacted under the following reaction conditions: concentration of alkali salt of 2 to 30% by weight, pH value of the reaction system of 5.5 to 7.8, and reaction temperature of 20 to 100° C., preferably 40 to 80° C., the resulting calcium sulfite having a crystal size of 1 to 100 microns (1 to 30 microns in the minor axis, and 5 to 100 microns in the major axis).

The foregoing objects and other objects of the present invention will become more apparent from the following detailed description of the invention when read in conjunction with the preferred examples and the accompanying drawings which are the results of various experiments in graphical representation.

In the drawing:

FIG. 2 is another graphical representation showing relationship between the pH value of the reaction system and the length of short axis of the prismatic crystal constituting calcium sulfite;

FIG. 3 is still another graphical representation showing relationship between the length of the short axis of the prismatic crystal and elongation of the composite material consisting of calcium sulfite and polyolefin;

FIG. 4 is an infrared ray absorption spectrum of calcium sulfite produced in accordance with the present invention, and that produced by the conventional method; and FIG. 5 is an X-ray diffraction diagram of calcium sulfite produced in accordance with the present invention.

Figure 1:
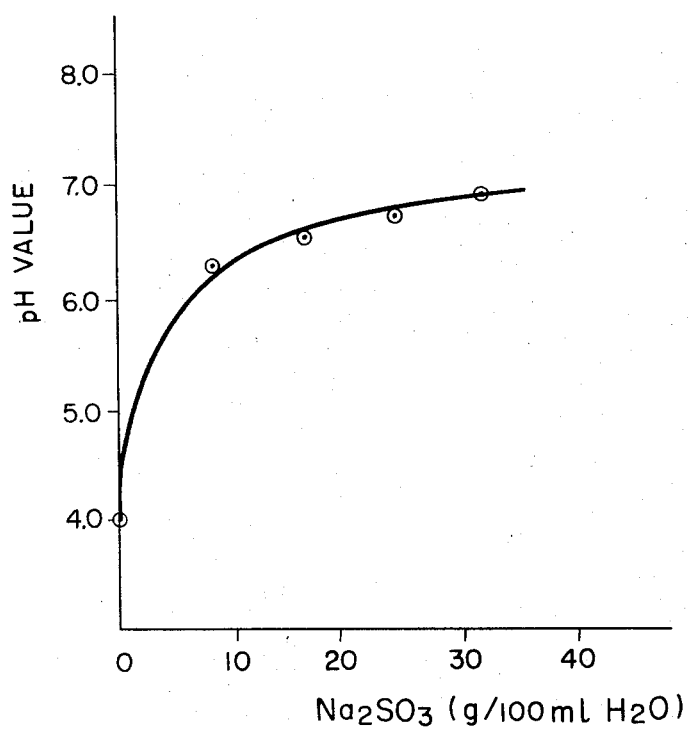
FIG. 1 is a graphical representation showing variations in pH value when alkali sulfite is added to acidic alkali sulfite.

While gypsum is consumed in a large amount as a coagulating agent for production of fire-resistant gypsum board and cement, the industries have paid attention to the results of research and development recently promulgated with respect to a composite material having properties suitable for synthetic paper and synthetic wood, which material is produced from a mixture of crystalline polyolefin and gypsum-type inorganic salt added thereto.

The present inventors also have been conducting researches on various new composite materials having improved capabilities which is obtained by adding excessive amount of inorganic salt to crystalline polyolefin. From the researches and studies they have found that shaped articles formed by melt-processing a composition consisting of crystalline polyolefin and 50–85% by weight of calcium sulfite according to this invention added thereto with respect to the total amount of the polyolefin, exhibits such superior matrix-filler interfacial exfoliability and other favorable physical properties that cannot be expected from a composition formulated by addition of calcium sulfite having particle size of less than several microns and available in general market. More particularly, shaped articles manufactured by melt-forming a composition consisting of crystalline polyolefin and 50–85% by weight of calcium sulfite of this invention having a crystal size of 1–100μ (1–30μ in minor axis and 5–100μ in major axis) added thereto with respect to the total amount of the polyolefin are shown to be a base material having an elongation of 50–600% at room temperature, whereas shaped articles melt-formed from a composition consisting of crystalline polyolefin and 50–85% by weight of calcium sulfite having particle size of less than several μ and available in general market added thereto are shown to be a base material as brittle as having an elongation of less thn 50% at a room temperature.

Referring now to the drawing, FIG. 3 shows the results of elongation by stretching (Tensilon tensile speed of 20 mm./min. as prescribed by JIS K-6771) of a press-molded plate obtained from a composition consisting of 70% by weight of calcium sulfite and 30% by weight of polyethylene ("Hizex 5100LP," a product of Mitsui Chemical Co., Ltd., Japan), wherein the size of the calcium sulfite crystals, all of which are in rectangular, prismatic shape having length of the major axis of 40 microns, was varied in the length of the minor axis alone. When the molded article is stretched in this manner, the crystal constituting the molded article undergoes little change in its thickness and the length thereof is elongated with the result that specific gravity of the molded article lowers to that extent. In other words, by this stretching, the interface between polyolefin and calcium sulfite exfoliates to create clearance therebetween. When the clearance is created in this manner, the molded article becomes extremely pliable, and the one elongated by more than 1.5 times becomes a synthetic-leather-like sheet. The molded article elongated even by less than 1.5 times is also very pliable. However, if the unit crystals of calcium sulfite used are not prismatic in shape, a molded article formed from such material does not become so pliable even if it is stretched by 10 to 20%.

Calcium sulfite of the present invention cannot be manufactured by the generally-known processes represented by the following equations (1)–(7).

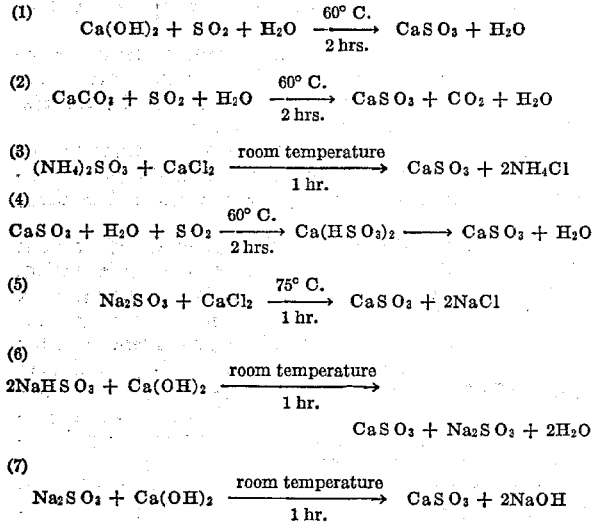

Calcium sulfite manufactured by the abovementioned syntheses is composed of micro-crystals having less than $5\mu$ in apparent size. Even some of the crystals having apparent size of several tens of microns are only agglomerations of micro-crystals having less than $1\mu$ in the crystal size. Such crystals are easily broken by application of shearing force. In this consequence, calcium sulfite of prismatic crystal shape having a crystal size of 1–$100\mu$ cannot be produced by the afore-mentioned synthetic methods.

In the following, the process for manufacturing calcium sulfite in accordance with the present invention is described in more detail.

The process steps according to the present invention consist of causing sulfur dioxide gas per se, or exhaust gas containing sulfur dioxide gas to be absorbed in aqueous solution of alkali sulfite to form acidic alkali sulfite in accordance with the following chemical equation (8):

(8) 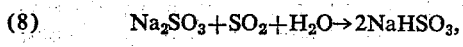

and then, adding an equivalent amount of calcium carbonate powder to the aqueous solution of the acidic alkali sulfite to cause them to react each other in accordance with the following equation (9) thereby to produce calcium sulfite:

(9) 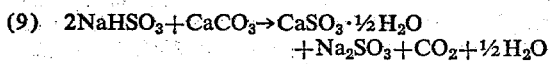

In the reaction represented by the equation (9), the dissolution speed of calcium carbonate powder is regarded as substantially governing the formation speed of calcium sulfite. More specifically, when calcium carbonate dissolves in the aqueous reaction solution, the reaction shown in the equation (9) is completed in a short period of time at a temperature range of from room temperature to 100° C., hence no particular limitation needs be set with regard to the reaction temperature.

Aqueous solution of acidic alkali sulfite shows acidity at a pH value of 4.0. From the standpoint of solubility of calcium carbonate, a pH value of as low as possible is preferred but calcium sulfite produced from reaction with acidic alkali sulfite of extremely low pH value assumes to be planar in its crystal form having a side length of several microns and a thickness of less than 1 micron. When such calcium sulfite is mixed with polyolefin, and then molded, the interfacial exfoliation between the polymer and calcium sulfite in the shaped article is poor.

In the manufacture of calcium sulfite of the present invention having crystals of 1 to 100 microns in size, it is required to adjust the pH value of the reaction system within the range of 5.5–7.8 by mixing alkali sulfite thereinto. Adjustment of the pH value of the reaction system by addition of alkali sulfite thereinto not only has a significant effect on crystal growth of calcium sulfite formed therefrom but also contributes to prevent the $SO_4$ radical from mixing into calcium sulfite produced. In case no alkali sulfite is added to the reaction system prior to commencement of the reaction to adjust the pH value of the reaction system within the range of 5.5–7.8, calcium sulfite to be produced therefrom contains therein gypsum, or has the length of the shortest crystal axis of less than 1 micron.

If calcium sulfite contains even a few percent of gypsum on its crystal surface, when such calcium sulfite is mixed with polyolefin, the plastic composite material melt-formed from the mixture has an elongation of less than 50% irrespective of the size of calcium sulfite crystals, and the interfacial exfoliation between calcium sulfite and polyolefin of the composite material is also poor.

FIG. 1 shows the variations in pH value caused by addition of alkali sulfite to acidic alkali sulfite. It is understood from this graphical representation that the pH value of the aqueous solution can be raised to 6.5 by addition of 15% of alkali sulfite to 8% solution of acidic alkali sulfite (pH 4.0).

The pH of acidic alkali sulfite solution can be raised even higher by addition of excessive amount of alkali sulfite. However, when the pH value of the reaction system becomes higher than 7.8, solubility of calcium carbonate thereinto significantly lowers with the result that the reaction stops virtually, which is not preferable.

If the reaction conditions are well controlled, the relationship between the pH of the reaction system and the crystal size of calcium sulfite produced can be such as that shown in FIG. 2.

(10) 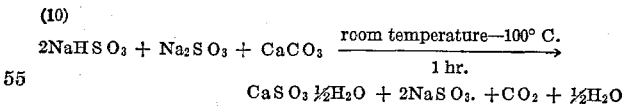

There are many other factors affecting the growth of crystals of calcium sulfite, one of which is the salt concentration in the reaction solution. The total salt concentration in the mixture solution of acidic alkali sulfite and alkali sulfite should preferably be 2 to 30% at the start of the reaction. If calcium sulfite is synthesized from a solution having a total salt concentration lower than 2%, micro-crystals of smaller than a few microns in size can only be formed. Besides, such process itself is not regarded as advantageous from the economical standpoint. To increase the total salt concentration of the reaction solution to above 30% is difficult due to limited solubility of the salts, and is not preferred because calcium sulfite produced therefrom becomes smaller in its crystallinity.

Reaction temperature also affects the growth of crystals of calcium sulfite. Calcium sulfite produced at a reaction temperature within the range of from a room temperature to 40° C. is of spherulites having a diameter of about 10 to 30 microns. It is noted by observation through an optical microscope that the spherulites are agglomerates or polycrystals of fine crystals of calcium sulfite, each of the crystals being in rectangular form of a few microns in size. However, it has been confirmed that the spherulites of calcium sulfite thus obtained are hardly broken into micro-crystals even by application of shearing force, and maintain the original spherical form thereof, when it is mixed with polyolefin to prepare a composite material, and the material is melt-formed into a desired shaped product. Consequently, the property of the spherulites is considered different from that of such spherical particles which are the agglomerate of microcrystals of calcium sulfite available in general market, and which tend to be broken into finer particles in the process of melt-forming.

When the synthesis of calcium sulfite is carried out at a reaction temperature within the range of from 40° to 80° C., the short axis of the prismatic crystals of calcium sulfite produced does not change, but the long axis thereof tends to become longer as the heating temperature is higher. On the contrary, when the reaction temperature is raised above 80° C., both long and short axis of the prismatic crystals show a tendency to become shorter with the result that the size of the prismatic crystals to be produced becomes smaller.

In order to enable the skilled persons in the art to reduce the invention into practice, the following preferred examples are presented. However, it should be understood that these examples are illustrative only, and that they do not intend to limit the scope of the present invention as set forth in the appended claims.

EXAMPLE 1

Exhaust gas from steam-power station using fuel oil was absorbed in an aqueous solution of sodium sulfite to synthesize acidic sodium sulfite. 5,200 ml. of 15% aqueous solution of sodium sulfite containing 416 g. of the abovementioned acidic sodium sulfite was charged into a reaction vessel equipped with agitating blades rotating at 300 r.p.m., and then the solution was heated to the temperatures shown in Table 1 below. The pH value of the solution prior to commencement of the reaction was 6.4. Subsequently, 200 g. of light calcium carbonate (sedimented) in powder form having particle size of 400 meshes was added to the abovementioned aqueous solution of sodium sulfite containing acidic sodium sulfite, and further reaction was conducted for about 90 minutes until generation of carbon dioxide gas could not be recognized. After the reaction was over, calcium sulfite produced was separated by filtration, and the product underwent repeated cycles of washing with warm water of 60–80° C., and dehydration so as to remove water-soluble salts such as sodium sulfite, Glauber's salt, etc. Thereafter, the calcium sulfite thus produced was dried for about 8 hours at 180° C. in a drier until it reached the constant weight. The results of the reaction are shown in Table 1.

TABLE 1

Reaction temperature and crystal form of calcium sulfite

| Sample No. | Reaction temperature (° C.) | Yield from reaction, percent | Crystal form | Size of crystal |
|---|---|---|---|---|
| 1–1 | 30 | 99.7 | Spherical | 10–13μ (diameter) |
| 1–2 | 80 | 98.5 | Prismatic | Major axis 20–50μ / Minor axis 5–15μ |
| 1–3 | 60 | 99.4 | do | Major axis 20–30μ / Minor axis 5–15μ |

It is apparent that the reaction temperature influences on the crystal form of calcium sulfite as produced. The pH value of Sample No. 1–1 at the completion of the reaction was as low as 6.8, whereas that of both Sample Nos. 1–2 and 1–3 was as high as 7.4. The reason for this is considered due to the fact that, in case of the reaction temperature being 30° C., generated carbon dioxide gas cannot be sufficiently eliminated and a part of the gas remains in the reaction system in the form of carbonic acid produced by dissolution of the gas into the aqueous solution, hence the pH degression of the reaction solution. 20% slurry of calcium sulfite prepared from the foregoing three samples has all the same analytical values such as pH of 9.2; apparent specific gravity of 1.2; volatile loss at 180° C./3 hrs. of less than 0.1%; and true specific gravity by toluene of from 2.52 to 2.54.

Infrared absorption spectra of the thus produced calcium sulfite are shown in FIG. 4, and X-ray diffraction patterns thereof in FIG. 5.

EXAMPLE 2

Sulfur dioxide gas purchased from general market was absorbed in an aqueous solution of sodium sulfite to synthesize acidic sodium sulfite. This acidic sodium sulfite was used in different concentrations as shown in Table 2 below for synthesis of calcium sulfite, the other raw materials having been in such proportions as shown in the same Table.

The reaction temperature for the synthesis was fixed at 75° C. and the reaction was continued at this heating temperature for 60 minutes with stirring (100 r.p.m.) until generation of carbon dioxide gas could no longer be observed. Calcium carbonate used in this synthesis was of a light grade (sedimented) having particle size of 400 meshes, which was added in an equivalent amount with respect to acidic sodium sulfite, in each sample. The comparative samples shown in Table 2 (2–4, 2–5, 2–6 and 2–7) represent the test results when no sodium sulfite was added to the reaction system.

The comparative samples 2–4 and 2–5 represent the cases where no Glauber's salt exists as impurity in the raw material salts, although the $SO_4$ radical is detected as impurity in the resultant calcium sulfite. The cause for this residual sulfuric acid radical is considered due to that in the course of dehydration and drying, a part of calcium sulfite is oxidized by air, and gypsum thus formed mixes into calcium sulfite.

The sample Nos. 2–6 and 2–7 show the cases wherein Glauber's salt, which is the impurity usually found in the largest quantity in the raw material salts, was intentionally added to the reaction system. When the Glauber's salt having the $SO_4$ radical exists in the reaction system, it easily mixes into calcium sulfite to be produced, and this impurity is hardly removable by washing with water. As a matter of course, it is preferred that the Glauber's salt does not exist in the raw material salts, but prevention of the impurity from being produced is difficult from the industrial standpoint in case desulfurization of exhaust gas is conducted by absorbing it in caustic soda or sodium sulfite.

Consequently, if the Glauber's salt is contained in the raw material salt, it is rather meaningful from the industrial standpoint as well as important for manufacturing calcium sulfite containing no gypsum impurity therein that appropriate reaction conditions be established so as to prevent the Glauber's salt impurity from mixing into the crystals of calcium sulfite produced.

The sample Nos. 2–1 and 2–2 were conducted with a view to achieving the abovementioned object and also to controlling the size of the prismatic crystals of calcium sulfite to be produced. As may be understood from comparison between sample Nos. 2–1, 2–2 of the present invention and sample Nos. 2–6, 2–7 of the comparative samples, neither gypsum nor Glauber's salt mixes into the crystals of calcium sulfite produced in the case of sample Nos. 2–1 and 2–2 of the present invention.

In other words, when sodium sulfite is added to the reaction system to adjust the pH value thereof, it is possible not only to control the size of monocrystal of calcium sulfite in prismatic shape, but also to prevent impurities such as Glauber's salt, gypsum, etc. from mixing into the calcium sulfite semihydrate to be produced.

TABLE 2
Reaction conditions and properties of calcium sulfite produced

| Sample No. | NaHSO₃ (g.) | Na₂SO₃ (g.) | Na₂SO₄ (g.) | CaCO₃ (g.) | H₂O (ml.) | Initial pH | Final pH | Yield of reaction (percent) | Crystal Form | Size (μ) | SO₄ group* | Apparent specific gravity (g./cm.³) |
|---|---|---|---|---|---|---|---|---|---|---|---|---|
| Present invention: | | | | | | | | | | | | |
| 2-1 | 52 | 97.5 | 3.3 | 25 | 650 | 6.4 | 7.4 | 99.3 | Prismatic | 10 x 40 | − | 1.21 |
| 2-2 | 52 | 260 | 3.3 | 25 | 650 | 6.8 | 7.7 | 99.2 | do | 10 x 40 | − | 1.20 |
| 2-3 | 52 | 97.5 | 0 | 25 | 650 | 6.4 | 7.4 | 99.4 | do | 10 x 40 | − | 1.21 |
| Comparative: | | | | | | | | | | | | |
| 2-4 | 52 | 0 | 0 | 25 | 650 | 4.2 | 7.3 | 99.6 | Rectangular plate | 10 x 10 | + | 0.86 |
| 2-5 | 250 | 0 | 0 | 25 | 650 | 3.9 | 5.3 | 99.8 | do | 10 x 10 | + | 0.88 |
| 2-6 | 52 | 0 | 3.3 | 25 | 650 | 4.1 | 7.4 | 95.7 | do | 10 x 10 | ++ | 0.69 |
| 2-7 | 52 | 0 | 3.6 | 25 | 650 | 4.1 | 7.3 | 90.2 | do | 10 x 10 | ++ | 0.49 |

*By infrared-ray absorption spectrum: Gypsum=1,150 cm.⁻¹; Glauber's salt=1,100–1,140 cm.⁻¹.

REFERENCE EXAMPLE 140 g. (70 wt. percent) of calcium sulfite specified in Table 3 below was dry-blended with 60 g. (30 wt. percent) of low-pressure polyethylene powder available in general market and having melt index of 0.3. The blend was formed into a rolled sheet of 0.5 mm. thick after it had been kneaded for about 5 minutes by rolls heated to the surface temperature of from 150 to 160° C. The rolled sheet was cut into square pieces of 10 cm. x 10 cm. each, three pieces of which were laminated and placed between chrome-plated steel plates, then pressed for 5 minutes under a load of 150 kg./cm.² in a pressure molding machine heated to 180° C., whereby plates of 1 mm. thick were press-formed and served for measurements of the physical properties thereof.

in crystal form, in which the crystal has a size range of from 1 to 100 microns (a short axis of 1 to 30 microns, and a long axis of 5 to 100 microns), said method comprising the steps of preparing an aqueous mixture of acidic alkali metal sulfite and alkali metal sulfite, and adding to and reacting with said aqueous mixture calcium carbonate, while maintaining the following reaction conditions:

a. concentration of the alkali metal salt (molar ratio of acidic metal sulfite to alkali metal sulfite being in a range of from 0.1 to 5.0) percent by weight_____ 2 to 30
b. pH value of the reaction system_____ 5.5 to 7.8
c. reaction temperature ° C._____ 40 to 80

2. The method according to claim 1, wherein the alkali metal sulfite used is sodium sulfite.

TABLE 3
Physical properties of molded plate produced from composite material of polyethylene and calcium sulfite (CaSO₃·½ H₂O)

| Sample No. | Kind of calcium sulfite | Tensile strength (kg./cm.²)¹ | Elongation (percent)¹ | T_f (° C.) in first measurement² | T_f (° C.) after repeated measurements of same sample² | Water absorption (percent)³ |
|---|---|---|---|---|---|---|
| Reference sample: | | | | | | |
| 3-1 | Sample No. 1-1 | 65 | 210 | −7 | <−80 | 0.17 |
| 3-2 | Sample No. 1-2 | 71 | 320 | −10 | <−80 | 0.20 |
| 3-3 | Sample No. 1-3 | 75 | 430 | −11 | <−80 | 0.21 |
| 3-4 | Sample No. 2-3 | 73 | 380 | −9 | <−80 | 0.19 |
| Comparative sample: | | | | | | |
| 3-5 | Sample No. of comparative sample 2-4 | 62 | 25 | +18 | +13 | 0.06 |
| 3-6 | Sample No. of comparative sample 2-6 | 65 | 8 | +26 | +23 | ---------- |

¹ JIS K-6771 (measured by "Tensilon" manufactured and sold by Toyo Seiki Co., Ltd., Japan, at room temperature in 200 mm./min. of tension speed).
² JIS K-6745.
³ JIS K-6911.

The plates formed from sample Nos. 3–1, 3–2, 3–3 and 3–4 of the present invention containing therein calcium sulfite were all found to have more than 200% of elongation and low softening point. Particularly, when the same samples were repeatedly measured for softening point thereof, it is found out that the samples are turned into such materials as having an extremely low softening point and excellent interfacial exfoliation between polyethylene and calcium sulfite.

What we claim is:
1. A method for producing calcium sulfite semihydrate

References Cited
UNITED STATES PATENTS 3,653,812  4/1972  Schneider et al. _____ 423—242
1,343,897  6/1920  Barstow _____ 423—512

OSCAR R. VERTIZ, Primary Examiner

E. R. CROSS, Assistant Examiner

U.S. Cl. X.R.
423—242